(12) United States Patent
Kondapalli

(10) Patent No.: US 8,341,454 B1
(45) Date of Patent: Dec. 25, 2012

(54) RENDERING A VIDEO STREAM BASED ON DIGITAL CLOCK GENERATED BASED ON TIMING INFORMATION

(75) Inventor: Raghu Kondapalli, San Jose, CA (US)

(73) Assignee: Marvell International Ltd. (BM)

( * ) Notice: Subject to any disclaimer, the term of this patent is extended or adjusted under 35 U.S.C. 154(b) by 1044 days.

(21) Appl. No.: 12/334,796

(22) Filed: Dec. 15, 2008

Related U.S. Application Data

(60) Provisional application No. 61/017,369, filed on Dec. 28, 2007.

(51) Int. Cl.
- *G06F 1/04* (2006.01)
- *G06F 1/12* (2006.01)
- *G06F 1/00* (2006.01)

(52) U.S. Cl. .......... 713/600; 713/400; 713/500

(58) Field of Classification Search .......... 713/400, 713/500, 600
See application file for complete search history.

(56) References Cited

U.S. PATENT DOCUMENTS

| | | | |
|---|---|---|---|
| 4,930,142 A * | 5/1990 | Whiting et al. | 375/376 |
| 5,815,689 A * | 9/1998 | Shaw et al. | 713/400 |
| 6,594,773 B1 | 7/2003 | Lisitsa et al. | |
| 6,970,448 B1 * | 11/2005 | Sparrell et al. | 370/347 |
| 7,391,791 B2 * | 6/2008 | Balassanian et al. | 370/503 |
| 7,643,089 B2 * | 1/2010 | Oku et al. | 348/441 |
| 7,669,113 B1 * | 2/2010 | Moore et al. | 715/201 |
| 7,724,843 B2 * | 5/2010 | May et al. | 375/340 |
| 7,792,412 B2 * | 9/2010 | Nishitani | 345/1.1 |
| 2006/0013263 A1 * | 1/2006 | Fellman | 370/503 |

* cited by examiner

*Primary Examiner* — Suresh Suryawanshi

(57) ABSTRACT

Systems, methods, and other embodiments associated with clock generation are provided. In one embodiment, a precise timing protocol message is parsed to extract timing information. Timing waveform parameters are calculated based on the timing information and a digital clock is generated based on the waveform parameters. A video stream can then be decoded and rendered, where the rendering depends on the digital clock.

21 Claims, 5 Drawing Sheets

RENDERING A VIDEO STREAM BASED ON DIGITAL CLOCK GENERATED BASED ON TIMING INFORMATION

CROSS REFERENCE TO RELATED APPLICATIONS

This application claims the benefit of U.S. provisional application Ser. No. 61/017,369 filed on Dec. 28, 2007, which is incorporated by reference in its entirety.

BACKGROUND

When information is transmitted over a network, the information is typically transmitted as related messages of data. The related messages may be represented as a stream of individual frames. The individual frames may need to be processed in a specific order. In one example, the related messages are video data. Frames may include both image data and audio data when the messages are video data. The video data may be created in a studio. The studio may use a studio clock to time stamp the frames of video data. The studio may use a global positioning satellite (GPS) based clock to time stamp the frames. The video data may be transmitted to a user of the video data over the network.

A person may desire to view the video data. A rendering device will recreate the video images. A precise rendering clock assures a frame is rendered at the correct time. A frame may be rendered after the frame has travelled through a network. The time stamp on the frame may be used to assure that the image data of the frame is rendered in a correct sequence. The rendering clock uses the time stamp to assure that the frame is rendered at the correct time.

The video data and the audio data may be out of synchronization when the video data of the frame is not rendered at the correct time. A viewer of the video data may notice a lip-sync issue when the audio data and video data are out of synchronization. Unsynchronized video data may also appear jittery when the video data is not synchronized between frames.

Synchronization issues still occur even when the frames are time stamped. A rendering clock in a rendering device may cause the video data to become unsynchronized. Conventionally a crystal may be used to generate the rendering clock. Silicon transistors and other silicon components may be used with the crystal to implement the rendering clock. The operating characteristics of the crystal, transistors, and other silicon components change with variations in voltage and temperature. A frequency of the rendering clock changes when the operating characteristics change. The synchronization of the video data is lost when the frequency of the rendering clock changes. A more effective way of processing video data may be desired.

SUMMARY

In one embodiment, an apparatus comprises a digital clock circuit and receive logic to receive a precise timing protocol message from a network device, where the timing protocol message includes timing information. Content logic is configured to receive content to be processed. Determination logic is configured to determine a frequency and a phase from the timing information. Digital clock logic controls the digital clock circuit to generate a digital clock with the frequency and the phase, where the digital clock is used to control the content logic to process the content.

In another embodiment, a precise timing protocol message is parsed to extract timing information. Timing waveform parameters are calculated based on the timing information and a digital clock is generated based on the waveform parameters. A video stream can then be decoded and rendered, where the rendering depends on the digital clock.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
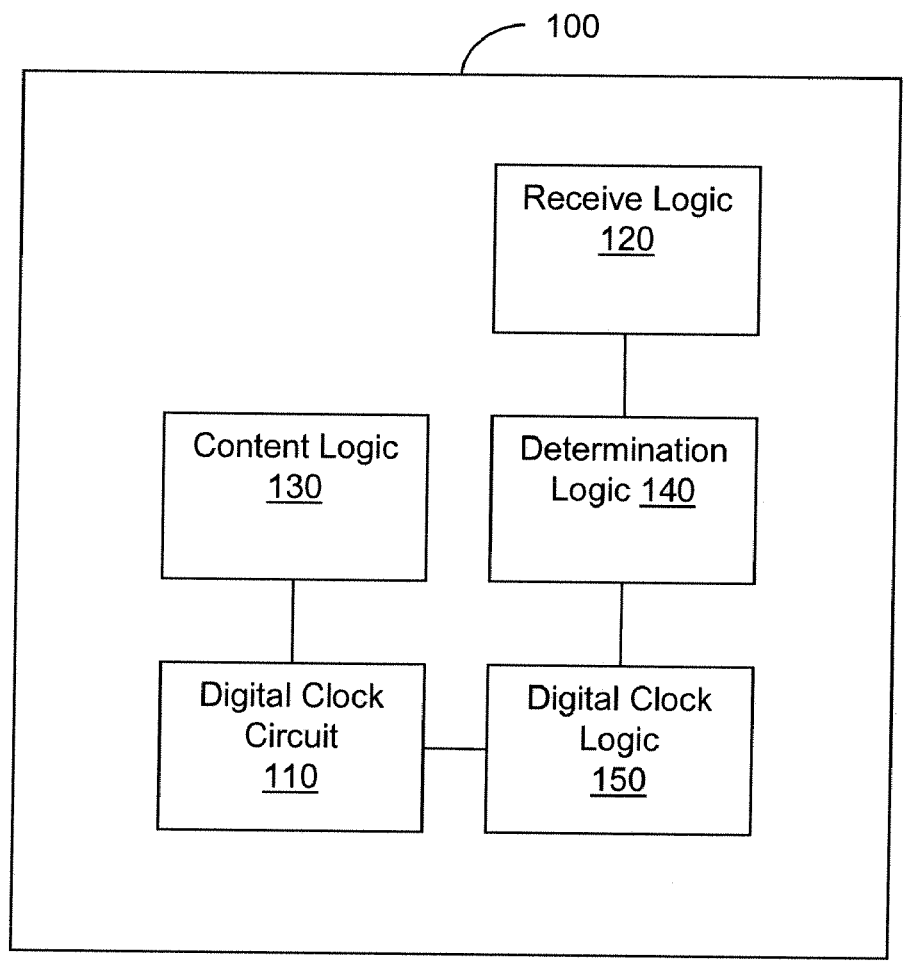
FIG. 1 illustrates one embodiment of an apparatus associated with clock generation.

Described herein are example systems, methods, and other embodiments associated with clock generation. Video data may be transmitted over a network to a user of the video data. The network may implement a precise timing protocol (PTP). In a PTP network, a network device called the grand master may have an accurate clock. The PTP may call this clock the grand master clock. Under the PTP, the grand master may transmit parameters of the grand master clock to other slave devices in the network. A slave device may use the received grand master clock parameters to generate a local digital clock. The local digital clock may be used to render the video data. The slave devices may periodically adjust their respective local digital clocks using subsequently received grand master parameters.

In one embodiment, a network device may receive a precise timing protocol message. The precise timing protocol message includes timing information. A frequency and a phase may be determined by scaling at least some of the timing information. The network device includes a digital clock circuit. The digital clock circuit is used to generate a digital clock with a desired frequency and phase. The network device may also receive streaming video data. The digital clock may control, at least in part, the rendering of the streaming video data. Generating a digital clock off the timing information may reduce or eliminate the need and the cost of using crystals, phase locked loops, voltage controlled oscillators, and/or other components.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, and other media from which a computer, a processor or other electronic device can read.

"Logic", as used herein, includes but is not limited to hardware, firmware, software stored or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

FIG. 1 illustrates one embodiment of an apparatus 100 associated with clock generation. The apparatus 100 may be a network device that receives and processes messages from network. The apparatus 100 includes a digital clock circuit 110 that generates a digital clock. In one embodiment, the digital clock clocks portions of the apparatus 100 that process the received messages. Digital components such as NAND gates, NOR gates, flip-flops, digital counters, and so on, may implement the digital clock circuit 110. The need and the cost of using crystals, phase locked loops, voltage controlled oscillators, and/or other components is reduced or eliminated because the digital clock circuit 110 is digital rather than analog. The digital clock circuit 110 may be configurable as discussed below.

The apparatus 100 includes receive logic 120. The receive logic 120 receives a timing protocol message from a network device. The timing protocol message includes timing information. The message may be a precise timing protocol (PTP) message. In one embodiment, the timing protocol message conforms to the Institute of Electrical and Electronic Engineers (IEEE) 1588 protocol or the IEEE 1722 protocol. A grand master may send the timing protocol message that contains a time stamp corresponding to the time that the grand master sent the message. The apparatus 100 may be one of a group of slave nodes that generate one or more clocks based on the time stamp.

In one embodiment, the apparatus 100 includes content logic 130. The content logic 130 receives content to be processed. The received content may be one frame of a stream of content. The frame may be related to other frames in the stream of content. For example, the content may be video content. Each frame may contain video data and/or audio data.

The apparatus 100 includes determination logic 140. The determination logic 140 determines a frequency and a phase from the timing information. The frequency and the phase may be determined by scaling at least some of the timing information. For example, a time stamp clock period of the timing information may be eight nanoseconds and an apparatus clock may need to toggle every 3125 nanoseconds. The apparatus clock period is then 3125 nanoseconds divided by eight nanoseconds. The division yields a value of about 390. The apparatus frequency is then about 1/390.

The apparatus 100 includes digital clock logic 150. The digital clock logic 150 controls the digital clock circuit 110 to generate a digital clock with the desired frequency and the phase generated from the determination logic 140. The digital clock controls, at least in part, the processing of the content by the content logic 130. The timing information may include time stamp clock information. In one embodiment, the digital clock logic 150 determines a time stamp frequency and a time stamp phase by scaling the time stamp clock information. The digital clock circuit 110 may generate a clock with the desired time stamp frequency and the time stamp phase.

In another embodiment, the determination logic 140 determines a remainder amount. The remainder amount may be based on the frequency. The determination logic 140 compensates the digital clock with the remainder amount on a clock tick. For example, when the time stamp clock period is 8000 picoseconds then the remainder amount is 8000 picoseconds times 0.625, which yields a remainder amount of 5000 picoseconds. One embodiment of processing the remainder and compensating the digital clock is described in more detail below with reference to tables 1-3.

Generating a digital clock using the PTP timing information improves video rendering. The video is more precisely rendered because the digital clock allows the frames to be accurately scheduled for rendering. Each accurately scheduled frame may be rendered at a time corresponding to a time the frame was generated in relation to other frames of a frame sequence. The synchronization of the video data to the audio data may be improved because the frames are accurately rendered. Synchronization of video and audio data may improve or eliminate lip-sync issues.

Figure 2:
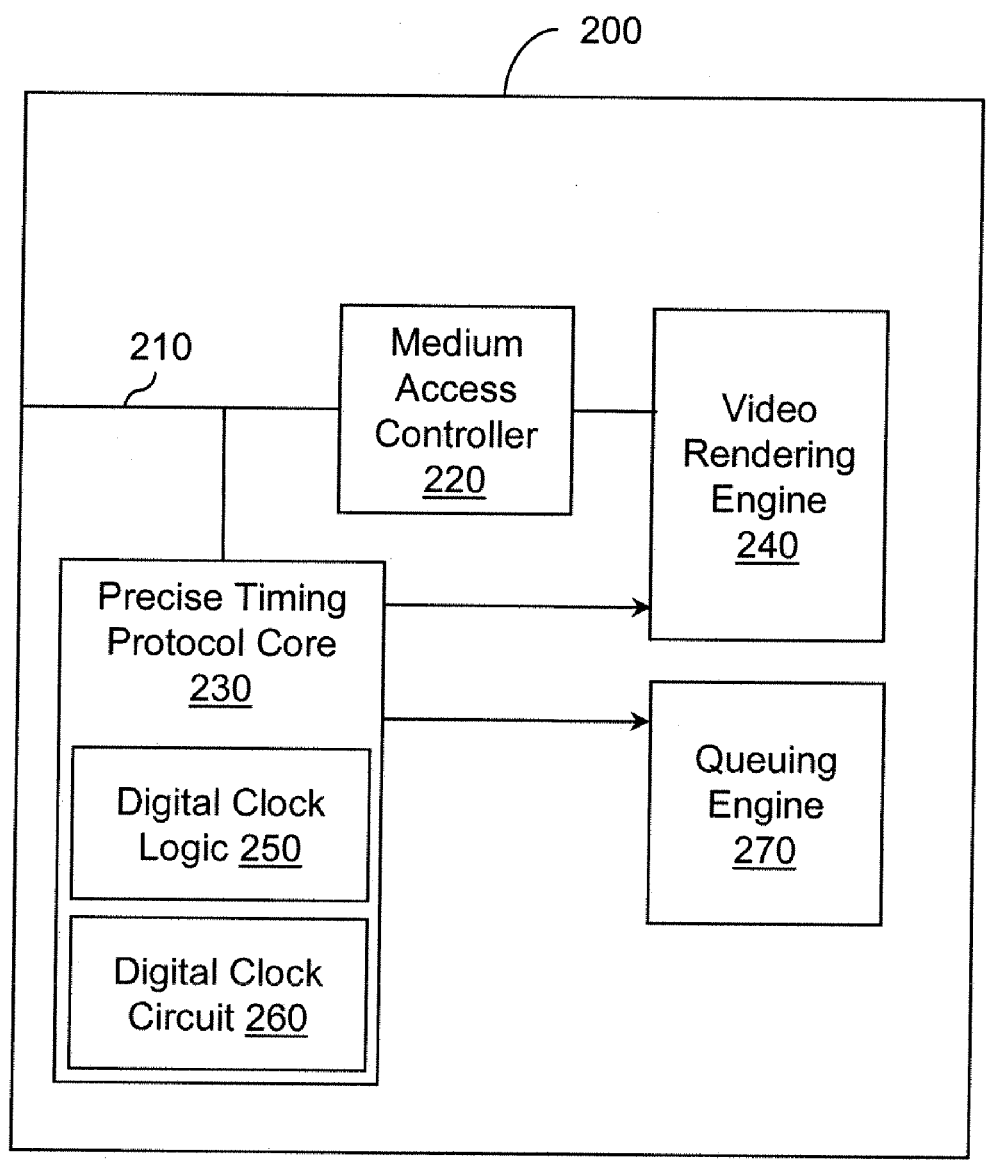
FIG. 2 illustrates another embodiment of an apparatus associated with clock generation.

FIG. 2 illustrates one embodiment of an apparatus 200 that generates a clock. The apparatus 200 includes a media independent interface (MII) bus 210. In one embodiment, the MII bus 210 may be a Gigabit MII (GMII) bus. The MII bus 210 is connected to a media access controller (MAC) 220 and a precise timing protocol core 230. In operation, the MAC 220 receives frames with video data via the M11 bus 210. The MAC 220 prepares the video data for rendering in a video rendering engine 240.

The precise timing protocol core 230 receives precise timing protocol messages via the M11 bus 210. In one embodiment, the precise timing protocol core 230 includes digital clock logic 250 and digital clock circuit 260. In one embodiment, the digital clock logic 250 determines a frequency and a phase similar to the digital clock logic 150 discussed above. The digital clock circuit 260 generates a digital clock similar to the digital clock circuit 110 discussed above. The video rendering engine 240 is clocked with the digital clock produced by the digital clock circuit 260. The video rendering engine 240 uses the digital clock to at least partially process the video data.

In one embodiment, one or more frames in the stream of content may contain a presentation time. The presentation time indicates the time at which the content is to be rendered onto a device. The video rendering engine 240 uses the presentation time to determine when to render frames. For example, when a frame is received, a digital clock value may be associated with the presentation time of the frame. A subsequent frame is rendered at a time based on presentation time of the subsequent frame and the digital clock value.

In one embodiment, the apparatus 200 includes a queuing engine 270. The digital clock logic 250 controls the digital clock circuit 260 to generate a queuing clock. The digital clock logic 250 determines a frequency and a phase based on a precise timing protocol message as discussed above. The queuing clock may be based on the frequency and phase. The queuing clock clocks the queuing engine 270. The queuing engine 270 is configured to order frames for rendering. In one embodiment, the queuing engine 270 orders multiple streams of frames for rendering by the same video rendering engine 240. The multiple streams of frames may contain different video content.

Figure 3:
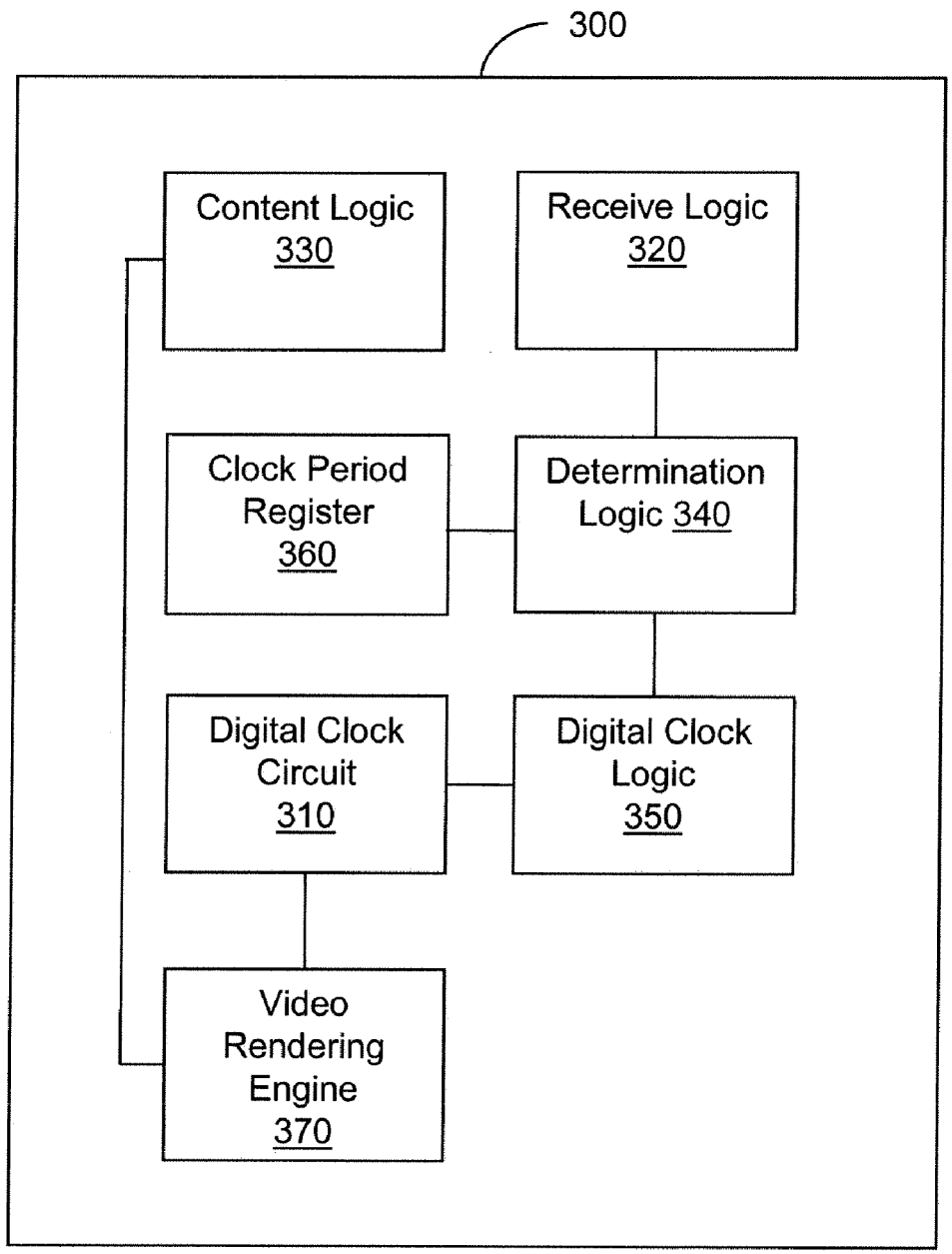
FIG. 3 illustrates another embodiment of an apparatus associated with clock generation.

FIG. 3 illustrates one embodiment of an apparatus 300 that generates a clock. The apparatus 300 includes a digital clock circuit 310, receive logic 320, content logic 330, determination logic 340, and digital clock logic 350. The digital clock circuit 310, receive logic 320, content logic 330, determination logic 340, and digital clock logic 350 are similar to the digital clock circuit 110, the receive logic 120, the content logic 130, the determination logic 140, and the digital clock logic 150, respectively, as discussed above with reference to FIG. 1.

In one embodiment, the apparatus 300 is software configurable. The apparatus 300 includes a clock period register 360. The clock period register 360 is used to store a clock period. The clock period is associated with the timing protocol message. The digital clock logic 350 controls the digital clock circuit 310 to generate a digital clock based on the clock period stored in the clock period register 360. In one embodiment, the clock period is a time stamp clock period of a time stamp clock. The time stamp clock is a clock used to insert time values in precise timing protocol messages.

In one embodiment, the apparatus 300 includes registers configured to operate as described in tables 1-3 as shown below.

TABLE 1

System on a Chip Clock Period Register

| Bits | Field | Type | Description |
|---|---|---|---|
| 15:9 | Reserved | n/a | Reserved |
| 8:0 | SoCClkPer | RWS 0x186 | System on a chip clock period. This specifies the clock period for the clock that gets generated from the PTP block to the rest of a system on a chip (SoC). The period is specified in TSClkPer increments. For example, if the TSClkPer is 8 nanoseconds and the SoC clock needs to toggle every 3.125 microsecond period, then the SoCClkPer is programmed to 0x186 and SoCClkComp is 0x1388. These values are hexadecimal values. 3125 ns/8 ns = 390.625 TSClkPer cycles Decimal 390 in hexadecimal is 0x186 0.625 × 8000 ps = 0x1388 = decimal 5000 |

TABLE 2

System on a Chip Clock Compensation Register

| Bits | Field | Type | Description |
|---|---|---|---|
| 15:0 | SoCClkComp | RWS 0x1388 | System on a chip clock compensation amount in picoseconds. This field specifies the reminder amount for when the SoC clock is being generated with a period specified by the SoCClkPer. Hardware logic keeps track of the remainder for every clock tick generated and compensates for it. |

TABLE 3

Time Stamping CLock Register

| Bits | Field | Type | Description |
|---|---|---|---|
| 15:0 | TSClkPer | RWS 0x1F4 | The time stamping clock period in picoseconds. This field specifies the clock period for the time stamping clock supplied to the PTP hardware logic. This is the clock that is used by the hardware logic to update the PTP Global Time Counter (PTP Global register, Offset 0x9 & 0xA). The default is calculated based on the 125 MHz period. |

In one embodiment, the TSClkPer (referred to in Tables 1 and 3) is a configurable parameter that is basically the frequency at which the PTP core time stamping logic operates (e.g. Precise Timing Protocol core 230 shown in FIG. 2). In another embodiment, the example implementation performs a digital compensation to determine the duty cycle. The compensation can be applied in cases where fractional values are left over in every clock period. The fractional values are accumulated over a period of time (e.g. the value 0.625 in table 1). When the sum becomes equal to one TSClkPer, an additional clock is inserted. In another embodiment, the compensation can be performed via an analog interpolator based phase compensation circuit. One of ordinary skill in the art will appreciate that in some embodiments other timing information may be stored in registers. Other registers may be used to store other clock parameters. In other embodiments, other registers may be used to calculate different clock parameters. Register field values may be located in other bit positions even though tables 1-3 show certain values located in certain register bit positions.

In one embodiment, the apparatus 300 processes the content by rendering the content. The digital clock controls, at least in part, the rendering of the content. In one embodiment, the apparatus 300 includes a video rendering engine 370 that renders video data in accordance with the digital clock (e.g. engine 370 is clocked with the digital clock). The digital clock may be generated by the digital clock circuit 310 as discussed above.

In some embodiments, the apparatus 300 is compatible with the Institute of Electrical and Electronic Engineers (IEEE) 1588 protocol, and/or the IEEE 1722 protocol.

In one embodiment, the apparatus 300 may be implemented in a chip. A chip is a set of micro-miniaturized electronic circuits fabricated on a single piece of semiconductor material. In another embodiment, the apparatus 300 is operably connected to a processor in a chip. In some embodiments, the apparatus 300 may be an integrated circuit. In some embodiments, the apparatus 300 may be a router, a switch, a gateway, and a network interface card (NIC). In other embodiments, the apparatus 300 is implemented in a high definition television (HDTV), a vehicle, a cellular phone, a set top box, a media player, or a Voice over Internet Protocol (VoIP) phone. For example, the apparatus 300 may be implemented in a high definition television to processes video packets.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 4:
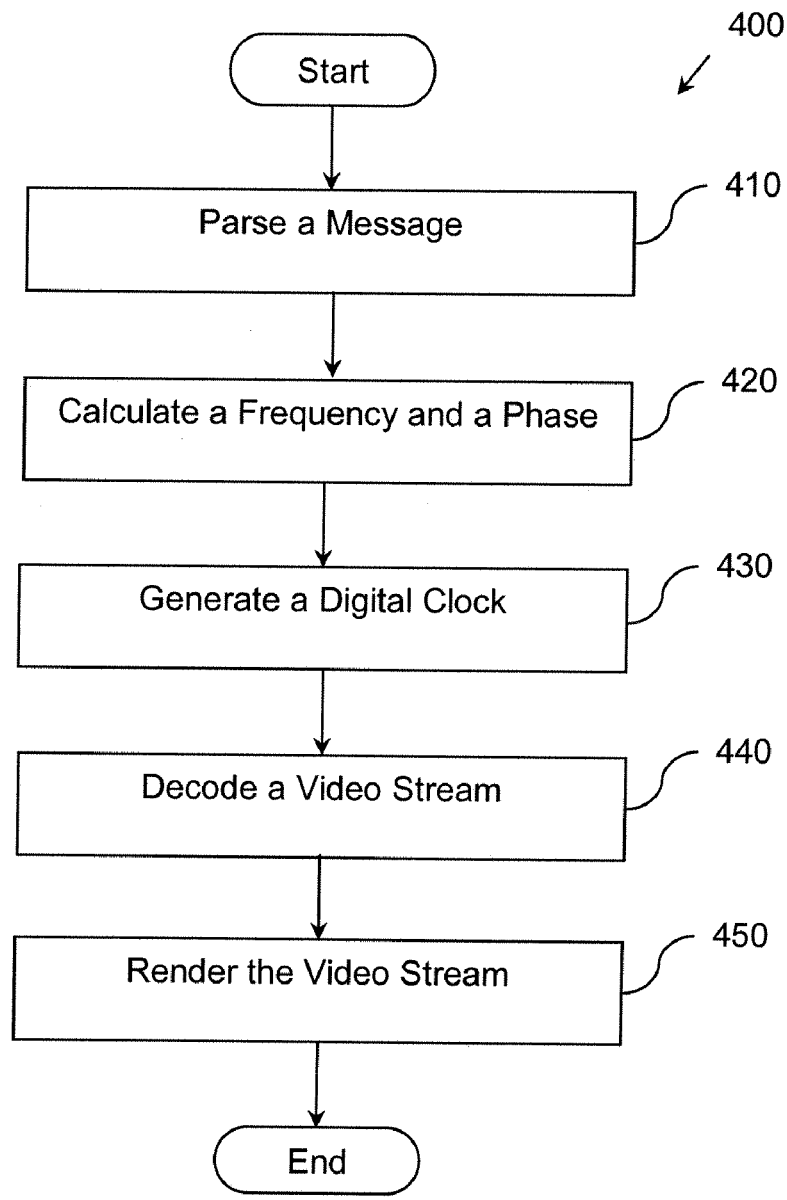
FIG. 4 illustrates one embodiment of a method associated with clock generation.

FIG. 4 illustrates one embodiment of a method 400 to process messages. The method 400 may comprise the activities the apparatus 100 performs to generate a digital clock. The method 400 includes, at 410, parsing a message that may be a precise timing protocol (PIP) message. The message is parsed to extract timing information, when the message is a PTP message. The timing information may be from a grand master on a network. The timing information may include a time stamp clock interval and/or a time stamp clock period.

The method 400 includes, at 420, calculating timing waveform parameters. The timing waveform parameters are based on the extracted timing information. In one embodiment, at least one waveform parameter is associated with the time stamp clock period. The waveform parameters may include a frequency, a frequency offset, a phase and/or a phase offset. The frequency may be calculated by scaling the timing information as discussed above.

A digital clock is generated at 430. In one embodiment, the digital clock is generated based on the waveform parameters, the time stamp clock interval, or both. The method 400 may include storing a clock period associated with the timing protocol message in a register. The digital clock is then generated based on the clock period stored in the register.

The method 400 includes, at 440, decoding a video stream. The video stream may include video data and audio data. The decoding, may include separating individual frames. The video data is sent to a rendering device and the audio data is sent to a sound generation device. The decoding, may also include scheduling the decoded frames for rendering. At 450 the video stream is rendered. The rendering is performed based on the digital clock.

In another embodiment, a queuing clock is generated based on the waveform parameters. A queuing engine can then be clocked using the queuing clock. For example in the apparatus 200 of FIG. 2, the generated queuing clock can be used to clock the queuing engine 270.

In another embodiment, a remainder amount is determined as part of the actions of block 520. The remainder amount is calculated as discussed above. The digital clock is then compensated with the remainder amount on a clock tick of the digital clock.

In some embodiments, the method 400 is compliant with the Institute of Electrical and Electronic Engineers (IEEE) 1588 protocol, and/or the IEEE 1722 protocol.

It will be appreciated that in one embodiment, the methods herein may be implemented as computer executable instructions embodied and stored on a computer-readable medium. When executed by a machine (e.g., processor, device) the instructions cause the machine to perform the methods herein and their equivalents. The methods can also be implemented with circuits.

Figure 5:
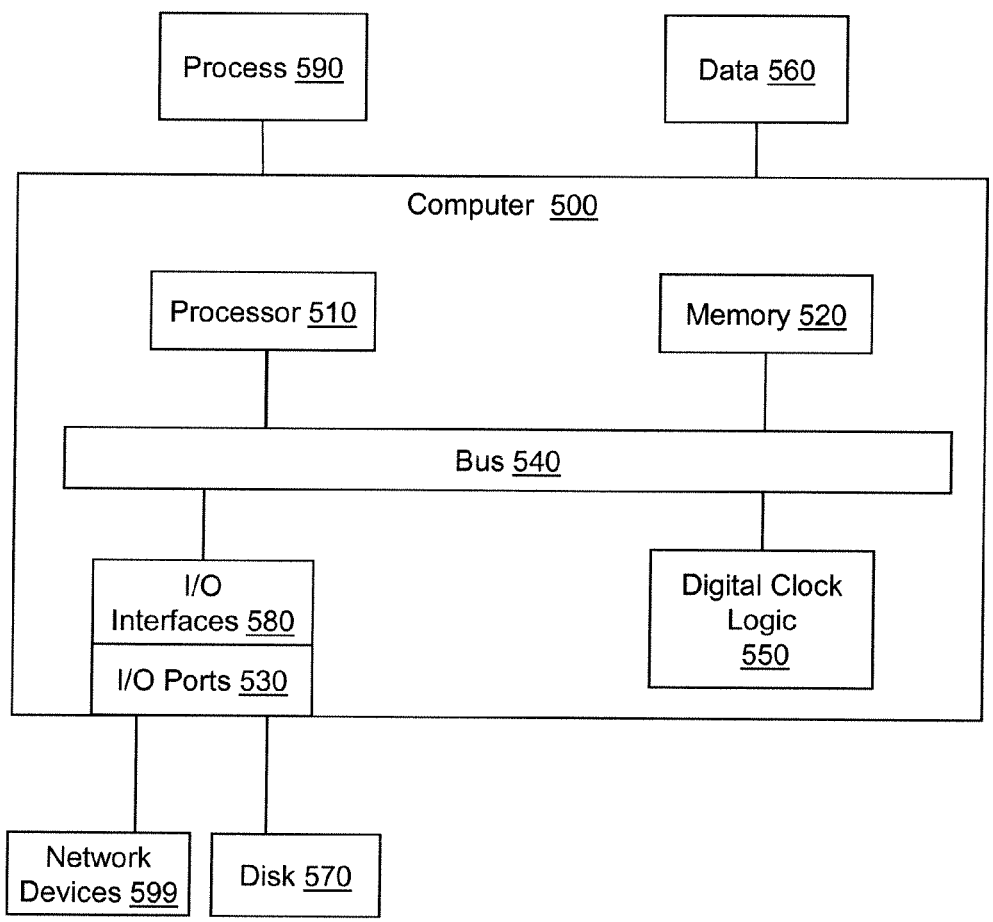
FIG. 5 illustrates one embodiment of a computing environment in which example systems and methods, and equivalents associated with clock generation may be implemented.

FIG. 5 illustrates an example computing device in which example systems and methods described herein, and equivalents, may be implemented. The example computing device may be a computer 500 that includes a processor 510, a memory 520, and input/output ports 530 operably connected by a bus 540. In one example, the computer 500 includes a digital clock logic 550 to generate a digital clock.

The digital clock logic 550 is a means (e.g., hardware, stored software, firmware) for generating a digital clock using information from a precise timing protocol message. The digital clock logic 550 can be implemented similar to the apparatus 100, 200, 300 (shown in FIGS. 1-3, respectively), and/or combinations of their features.

The digital clock logic 550 can include logic implemented, for example, as an ASIC or other type of circuit.

Generally describing an example configuration of the computer 500, the processor 510 may be a variety of various processors including dual microprocessor and other multi-processor architectures. A memory 520 may include volatile memory and/or non-volatile memory. Non-volatile memory may include, for example, read-only memory (ROM), programmable read only memory (PROM), erasable programmable read only memory (EPROM), electronically erasable programmable read only memory (EEPROM), and so on. Volatile memory may include, for example, random access memory (RAM), static random access memory (SRAM), dynamic random access memory (DRAM), and so on.

A disk 570 may be operably connected to the computer 500 via, for example, through an input/output interface (e.g., card, device) 580 and the input/output port 530. The disk 570 may be, for example, a magnetic disk drive, a solid state disk drive, a floppy disk drive, a tape drive, a Zip drive, a flash memory card, a memory stick, and so on. Furthermore, the disk 570 may be a compact disk read-only memory (CD-ROM) drive, a compact disk recordable (CD-R) drive, a compact disk rewritable (CD-RW) drive, a digital video disk read-only memory (DVD ROM), and so on. The memory 520 can store a process 590 and/or a data 560, for example. The disk 570 and/or the memory 520 can store an operating system that controls and allocates resources of the computer 500.

The bus 540 may be a single internal bus interconnect architecture and/or other bus or mesh architectures. While a single bus is illustrated, it is to be appreciated that the computer 500 may communicate with various devices, logics, and peripherals using other busses (e.g., peripheral component interconnect express (PCIE), 1394, universal serial bus (USB), Ethernet). The bus 540 can be types including, for example, a memory bus, a memory controller, a peripheral bus, an external bus, a crossbar switch, and/or a local bus.

The computer 500 may interact with input/output devices via the input/output (I/O) interfaces 580 including the digital clock logic 550 and the input/output ports 530. Input/output devices may be, for example, a keyboard, a microphone, a pointing and selection device, cameras, video cards, displays, the disk 570, the network devices 599, and so on. The input/output ports 530 may include, for example, serial ports, parallel ports, and USB ports.

The computer 500 can operate in a network environment and thus may be connected to the network devices 599 via the I/O interfaces 580, and/or the I/O ports 530. Through the network devices 599, the computer 500 may interact with a network. Through the network, the computer 500 may be logically connected to remote computers. Networks with which the computer 500 may interact include, but are not limited to, a local area network (LAN), a wide local area network (WLAN), a wide area network (WAN), and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

What is claimed is:

1. An apparatus, comprising:
   a digital clock circuit;
   receive logic to receive a precise timing protocol message from a network device, where the timing protocol message includes timing information;
   content logic to receive content to be processed;
   determination logic to determine a frequency and a phase from the timing information; and
   digital clock logic to control the digital clock circuit to generate a digital clock with the frequency and the phase, where the digital clock is used to control the content logic to process the content.

2. The apparatus of claim 1, where the timing information includes time stamp clock information, and where the digital clock logic determines the frequency and the phase by scaling the time stamp clock information.

3. The apparatus of claim 1, further including a video rendering engine to render the content, where the video rendering engine is clocked with the digital clock.

4. The apparatus of claim 1, where the determination logic determines a time stamp clock period associated with the timing protocol message, where the frequency is associated with the time stamp clock period.

5. The apparatus of claim 4, where the determination logic further determines the frequency by dividing a time value with the time stamp clock period.

6. The apparatus of claim 5, where the time value is 3125 nanoseconds when the time stamp clock period is 8 nanoseconds.

7. The apparatus of claim 1, where the determination logic determines a remainder amount based on the frequency, and where the digital clock logic compensates the digital clock with the remainder amount on a clock tick.

8. The apparatus of claim 1, further including a queuing engine, where the digital clock logic controls the digital clock circuit to generate a queuing clock, where the queuing clock is based on the frequency and the phase, and where the queuing clock clocks the queuing engine.

9. The apparatus of claim 1, where the apparatus is compatible with at least one of, the Institute of Electrical and Electronic Engineers (IEEE) 1588 protocol, and the IEEE 1722 protocol.

10. The apparatus of claim 1, further including a clock period register to store a clock period associated with the precise timing protocol message, and where the digital clock logic controls the digital clock circuit to generate the digital clock based on the clock period stored in the clock period register.

11. The apparatus of claim 10, where the clock period is a time stamp clock period.

12. The apparatus of claim 1, where the determination logic determines the frequency and the phase from the timing information by scaling at least some of the timing information.

13. The apparatus of claim 1, where the apparatus is software configurable.

14. The apparatus of claim 1, where the apparatus is incorporated into a router, a switch, a gateway, or a network interface card (NIC).

15. A method, comprising:
    parsing a precise timing protocol message to extract timing information;
    calculating timing waveform parameters based on the timing information;
    generating a digital clock based on the waveform parameters;
    decoding a video stream; and
    rendering the video stream based on the digital clock.

16. The method of claim 15, where the timing information includes a time stamp clock interval, and the digital clock is generated based on the time stamp clock interval.

17. The method of claim 15, where the timing information includes a time stamp clock period, where at least one waveform parameter is associated with the time stamp clock period.

18. The method of claim 15, further including determining a remainder amount based on the timing information and compensating the digital clock with the remainder amount on a clock tick of the digital clock.

19. The method of claim 15, further including generating a queuing clock, where the queuing clock is based on the timing waveform parameters, and clocking a queuing engine using the queuing clock.

20. The method of claim 15, further including storing a clock period associated with the precise timing protocol message in a register, and generating the digital clock based on the clock period stored in the register.

21. The method of claim 15, where the method is compliant with at least one of, the Institute of Electrical and Electronic Engineers (IEEE) 1588 protocol, and the IEEE 1722 protocol.

* * * * *